(12) United States Patent
Kusanose et al.

(10) Patent No.: US 9,340,667 B2
(45) Date of Patent: May 17, 2016

(54) HYDROGENATED BLOCK COPOLYMER PELLET, POLYOLEFIN RESIN COMPOSITION, AND MOLDED PRODUCT THEREOF

(71) Applicant: Asahi Kasei Chemicals Corporation, Tokyo (JP)

(72) Inventors: Yasuhiro Kusanose, Tokyo (JP); Mika Horiuchi, Tokyo (JP); Noriko Yagi, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/410,055

(22) PCT Filed: Jun. 25, 2013

(86) PCT No.: PCT/JP2013/067336
§ 371 (c)(1),
(2) Date: Dec. 19, 2014

(87) PCT Pub. No.: WO2014/002984
PCT Pub. Date: Jan. 3, 2014

(65) Prior Publication Data
US 2015/0344684 A1 Dec. 3, 2015

(30) Foreign Application Priority Data

Jun. 26, 2012 (JP) .................................. 2012-143103

(51) Int. Cl.
| | | |
|---|---|---|
| C08L 53/02 | (2006.01) | |
| C08F 297/04 | (2006.01) | |
| C08J 3/12 | (2006.01) | |
| C08L 23/06 | (2006.01) | |
| C08L 23/12 | (2006.01) | |
| C08L 23/04 | (2006.01) | |

(52) U.S. Cl.
CPC ............. *C08L 53/025* (2013.01); *C08F 297/04* (2013.01); *C08J 3/124* (2013.01); *C08L 23/06* (2013.01); *C08L 23/12* (2013.01); *C08J 2323/04* (2013.01); *C08J 2353/02* (2013.01); *C08L 23/04* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 5,308,906 A | * | 5/1994 | Taylor .................. | C08K 5/0091 428/152 |
| 6,399,696 B1 | | 6/2002 | Toyosawa et al. | |
| 6,455,635 B1 | | 9/2002 | Yonezawa et al. | |
| 2008/0009586 A1 | | 1/2008 | VanSumeren et al. | |
| 2010/0016508 A1 | | 1/2010 | Sasagawa et al. | |
| 2010/0087559 A1 | | 4/2010 | Kusanose et al. | |
| 2011/0245405 A1 | | 10/2011 | Jogo et al. | |
| 2012/0190786 A1 | | 7/2012 | Sasaki | |

FOREIGN PATENT DOCUMENTS

| | | |
|---|---|---|
| CN | 101506277 A | 8/2009 |
| EP | 1449856 A1 | 8/2004 |
| JP | 10330404 A | 12/1998 |
| JP | 11021314 A | 1/1999 |
| JP | 2000238066 A | 9/2000 |
| JP | 2001064445 A | 3/2001 |
| JP | 2002371136 A | 12/2002 |
| JP | 2006219507 A | 8/2006 |
| JP | 2007308525 A | 11/2007 |
| TW | 200833722 A | 8/2008 |
| WO | 0015681 A | 3/2000 |
| WO | 2008020476 A | 2/2008 |
| WO | 2010024382 A | 3/2010 |
| WO | 2011/040586 A1 | 4/2011 |

OTHER PUBLICATIONS

International Search Report issued in corresponding International Patent Application No. PCT/JP2013/067336 dated Sep. 24, 2013.
International Preliminary Report on Patentability issued in corresponding International Patent Application No. PCT/JP2013/067336 dated Sep. 24, 2013.
European Search Report issued in related European Patent Application No. 13810220.7 dated Jun. 18, 2015.

* cited by examiner

*Primary Examiner* — Jeffrey Mullis
(74) *Attorney, Agent, or Firm* — Morgan, Lewis & Bockius LLP

(57) ABSTRACT

It is an object of the present invention to provide a hydrogenated block copolymer pellet, which has the ability to become a molded product that is excellent in transparency, flexibility, bleeding resistance, and low combustion ash content, without causing blocking among pellets. A hydrogenated block copolymer pellet having 100 parts by mass of a pellet molded product of hydrogenated block copolymer A and 0.01 to 1.5 parts by mass of a dusting agent of polyethylene powder B, wherein the hydrogenated block copolymer A has at least one polymeric block a mainly including a vinyl aromatic monomer unit and at least one polymeric block b mainly including a conjugated diene monomer unit, in which a total of a 1,2-bond content and a 3,4-bond content in the polymeric block b before hydrogenation is 40% to 90%, the hydrogenated block copolymer A has a hardness of 30° to 67°, a content of the polymeric block a in the hydrogenated block copolymer A is 5% to 30% by mass, and the polyethylene powder B has a number average molecular weight of 15,000 or less, an average particle diameter of 1 to 15 μm, and an angle of repose of 45° to 70°.

12 Claims, No Drawings

HYDROGENATED BLOCK COPOLYMER PELLET, POLYOLEFIN RESIN COMPOSITION, AND MOLDED PRODUCT THEREOF

TECHNICAL FIELD

The present invention relates to a hydrogenated block copolymer pellet, a polyolefin resin composition, and a molded product thereof.

BACKGROUND ART

A hydrogenated block copolymer of a conjugated diene monomer and a vinyl aromatic monomer has elasticity equivalent to that of vulcanized natural rubber or synthetic rubber at ordinary temperature, although it is not vulcanized. Such a hydrogenated block copolymer is excellent in weathering resistance and heat resistance, and further, it has processability equivalent to that of a thermoplastic resin at a high temperature. Hence, the hydrogenated block copolymer has been put to a wide range of practical uses for appliance parts, automobile parts, wire-coating materials, industrial parts, adhesive materials, wrapping materials, medical devices, etc.

A polypropylene resin composition, which is obtained by mixing a polypropylene resin with a hydrogenated block copolymer having a block of a relatively low content of vinyl aromatic monomer and a block of a conjugated diene monomer with a relatively high vinyl bond content, is a material excellent in transparency and flexibility. Thus, the polypropylene resin compositions have been widely used for medical use, coating materials, wrapping materials, toys, etc., with intended uses for situations in which transparency can be utilized.

In recent years, studies regarding alternative materials for soft vinyl chloride resins have been conducted. As an alternative material having flexibility, a composition comprising a hydrogenated block copolymer obtained by hydrogenation of a copolymer having a block of a vinyl aromatic monomer and a block in which the vinyl bond content of a conjugated diene monomer portion is 62% or more, and a polypropylene resin, has been disclosed (see, for example, Patent Literature 1).

Moreover, there has been disclosed a method for producing, at a high production rate, a hydrogenated block copolymer which has a conjugated diene monomer with a high vinyl bond content and a vinyl aromatic monomer block with a narrow molecular weight distribution, and which has a narrow molecular weight distribution (see, for example, Patent Literature 2).

Furthermore, there has been disclosed a thermoplastic elastomer pellet, which is formed by adding fine particles of polypropylene having an average particle diameter of 150 μm or less to a pellet of a thermoplastic elastomer composition obtained by the melt mixing of a hydrogenated styrene elastomer, a softener for rubber and polypropylene (see, for example, Patent Literature 3).

CITATION LIST

Patent Literature

Patent Literature 1: International Publication WO2000/15681
Patent Literature 2: International Publication WO 2008/020476
Patent Literature 3: Japanese Patent Laid-Open No. 2002-371136

SUMMARY OF INVENTION

Technical Problem

However, the polymer described in Patent Literature 1 has a wide molecular weight distribution of blocks of vinyl aromatic monomers, and thus, only hydrogenated block copolymers that are extremely likely to cause pellet blocking can be obtained.

In addition, in Patent Literature 2, such blocking resistance has been improved to a certain extent, but it is further necessary to mix an agent for preventing pellet blocking into the hydrogenated block copolymer. For instance, in order to improve the blocking resistance of the hydrogenated block copolymer, Patent Literature 2 describes the mixing of an antiblocking agent. As such antiblocking agents, Patent Literature 2 describes calcium stearate, magnesium stearate, zinc stearate, ethylenebis stearylamide, talc, amorphous silica, metallic soap, etc.

Moreover, in Patent Literature 3, propylene particles are used as a dusting agent applied to a hydrogenated block copolymer pellet, and the blocking resistance is thereby improved. However, when a copolymer having a specific structure is mixed with a polyolefin resin to form a polyolefin resin composition, the copolymer has excessively high compatibility with the polyolefin resin, and thus, it is completely incorporated into the composition. Thus, some powders hardly appear on the surface. Accordingly, there is still a room for improving surface smoothness. Further, Patent Literature 3 is also problematic in terms of stress-whitening resistance, depending on the structure of the copolymer.

The present invention has been completed, while taking into consideration the aforementioned problems of prior art techniques. It is an object of the present invention to provide: a hydrogenated block copolymer pellet, which does not cause blocking among pellets and is used to obtain a molded product excellent in transparency, surface smoothness, stress-whitening resistance, flexibility, bleeding resistance, and low combustion ash content; a polyolefin resin composition; and a molded product thereof.

Solution to Problem

As a result of intensive studies directed towards achieving the aforementioned object, the present inventors have found that the blocking of a hydrogenated block copolymer pellet having a specific structure can be prevented by applying polyethylene powder having a specific molecular structure, physical properties and average particle diameter to the hydrogenated block copolymer pellet, and that the aforementioned object can be effectively achieved with the thus produced hydrogenated block copolymer pellet, the blocking of which is prevented, a polyolefin resin composition comprising the pellet, and a molded product comprising the composition, thereby completing the present invention.

Specifically, the present invention is as follows.

[1] A hydrogenated block copolymer pellet comprising 100 parts by mass of a pellet molded product of hydrogenated block copolymer A and 0.01 to 1.5 parts by mass of a dusting agent of polyethylene powder B, wherein
the hydrogenated block copolymer A comprises at least one polymeric block a mainly comprising a vinyl aromatic monomer unit and at least one polymeric block b mainly comprising a conjugated diene monomer unit, in which a total of a 1,2-bond content and a 3,4-bond content in the polymeric block b before hydrogenation is 40% to 90%, the hydrogenated block copolymer A has a hardness (JIS-A) of 30° to 67°, a content of the polymeric block a in the hydrogenated block copolymer A is 5% to 30% by mass, and the polyethylene powder B has a number average molecular weight of 15,000 or less, an average particle diameter of 1 to 15 μm, and an angle of repose of 45° to 70°.

[2] The hydrogenated block copolymer pellet according to [1], wherein the polyethylene powder B adheres to a surface of the hydrogenated block copolymer A.

[3] The hydrogenated block copolymer pellet according to [1] or [2], wherein the polyethylene powder B has a melting point of 110° C. or higher.

[4] The hydrogenated block copolymer pellet according to any one of [1] to [3], wherein 80% or more of an olefin unsaturated double bond contained in the polymeric block b before hydrogenation is hydrogenated.

[5] The hydrogenated block copolymer pellet according to any one of [1] to [4], wherein the vinyl aromatic monomer unit comprises a styrene unit, and the conjugated diene monomer unit comprises a butadiene unit.

[6] The hydrogenated block copolymer pellet according to any one of [1] to [5], wherein the total of the 1,2-bond content and the 3,4-bond content in the polymeric block b before hydrogenation is 40% to 60%.

[7] The hydrogenated block copolymer pellet according to any one of [1] to [5], wherein the total of the 1,2-bond content and the 3,4-bond content in the polymeric block b contained before hydrogenation is more than 60% and 90% or less.

[8] The hydrogenated block copolymer pellet according to any one of [1] to [7], wherein the hydrogenated block copolymer A comprises a following tetrablock structure: the polymeric block a—the polymeric block b (b1)—the polymeric block a—the polymeric block b (b2), and a mass of the b2 is 0.5% to 9% by mass based on a total mass of the hydrogenated block copolymer A, and a mass of the b1 is 50% or more greater than the mass of the b2.

[9] The hydrogenated block copolymer pellet according to any one of [1] to [8], wherein the polyethylene powder B has the average particle diameter of 1 to 10 μm, and the polyethylene powder B has the angle of repose of 50° to 65°. [10] A molded product comprising the hydrogenated block copolymer pellet according to any one of [1] to [9].

[11] A polyolefin resin composition comprising the hydrogenated block copolymer pellet according to any one of [1] to [9] and a polyolefin resin C, wherein the hydrogenated block copolymer pellet/the polyolefin resin C=3 to 97 parts by mass/97 to 3 parts by mass.

[12] A molded product comprising the polyolefin resin composition according to [11].

Advantageous Effects of Invention

According to the present invention, there can be obtained: a hydrogenated block copolymer pellet, which does not cause blocking among pellets and is used to obtain a molded product excellent in transparency, surface smoothness, stress-whitening resistance, flexibility, bleeding resistance, and low combustion ash content; a polyolefin resin composition; and a molded product thereof.

DESCRIPTION OF EMBODIMENT

Hereinafter, the embodiment for carrying out the present invention (hereinafter simply referred to as "the present embodiment") will be described in detail. The present invention is not limited to the following embodiment, and it may be modified in various ways within the range of the gist thereof.

Hydrogenated Block Copolymer Pellet

The hydrogenated block copolymer pellet according to the present embodiment (hereinafter also referred to as "hydrogenated block copolymer pellet X") comprises 100 parts by mass of a pellet molded product of hydrogenated block copolymer A and 0.01 to 1.5 parts by mass of a dusting agent of polyethylene powder B, wherein the hydrogenated block copolymer A comprises at least one polymeric block a mainly comprising a vinyl aromatic monomer unit and at least one polymeric block b mainly comprising a conjugated diene monomer unit, in which a total of a 1,2-bond content and a 3,4-bond content in the polymeric block b before hydrogenation is 40% to 90%, the hydrogenated block copolymer A has a hardness (JIS-A) of 30° to 67°, a content of the polymeric block a in the hydrogenated block copolymer A is 5% to 30% by mass, and the polyethylene powder B has a number average molecular weight of 15,000 or less, an average particle diameter of 1 to 15 μm, and an angle of repose of 45° to 70°.

The hydrogenated block copolymer pellet X according to the present embodiment is formed by applying the polyethylene powder B to a pellet molded product of the hydrogenated block copolymer A. The polyethylene powder B preferably adheres to the surface of the hydrogenated block copolymer A. Thereby, the blocking resistance tends to be further improved.

The content of the polyethylene powder B is 0.01 to 1.5 parts by mass, preferably 0.05 to 1.0 parts by mass, more preferably 0.1 to 0.8 parts by mass, and even more preferably 0.2 to 0.6 parts by mass, based on 100 parts by mass of the pellet molded product of the hydrogenated block copolymer A. When the content of the polyethylene powder B is in the above-mentioned range, the obtained hydrogenated block copolymer pellet tends to have an excellent blocking-preventing effect, and to be more excellent in the transparency of a hydrogenated block copolymer and a molded product of a polyolefin resin composition that is based on the hydrogenated block copolymer pellet.

A means for confirming the adhesion of the polyethylene powder B to the surface of a pellet of the hydrogenated block copolymer A is not particularly limited. For example, such adhesion can be confirmed by washing 500 mg of the hydrogenated block copolymer pellet X with methanol and then evaporating the methanol wash liquid to recover the polyethylene powder B.

In the present description, individual monomer units that constitute a polymer are denominated in accordance with the names of monomers from which the monomer units are derived. For instance, the term "vinyl aromatic monomer unit" is used to mean a constitutional unit of a polymer generated as a result of polymerization of a vinyl aromatic compound as a monomer. The structure of the vinyl aromatic monomer unit is a molecular structure in which two carbons of a substituted ethylene group derived from a substituted vinyl group constitute a binding site. On the other hand, the term "conjugated diene monomer unit" is used to mean a constitutional unit of a polymer generated as a result of polymerization of a conjugated diene as a monomer. The structure of the conjugated diene monomer unit is a molecular structure in which two carbons of olefin derived from a conjugated diene monomer constitute a binding site.

Hydrogenated Block Copolymer A

The hydrogenated block copolymer A used in the present embodiment comprises at least one polymeric block a mainly comprising a vinyl aromatic monomer unit and at least one polymeric block b mainly comprising a conjugated diene monomer unit, in which the total of the 1,2-bond content and the 3,4-bond content before hydrogenation is 40% to 90%. The content of the polymeric block a in the hydrogenated block copolymer A is 5% to 30% by mass. In addition, the hydrogenated block copolymer A has a hardness (JIS-A) of 30° to 67°.

Polymeric Block a

The polymeric block a mainly comprises a vinyl aromatic monomer unit, and at least one polymeric block a is comprised in the hydrogenated block copolymer A. The content of the polymeric block a in the hydrogenated block copolymer A is 5% to 30% by mass. The vinyl aromatic monomer used in the present embodiment is not particularly limited. Examples of the vinyl aromatic monomer include styrene, α-methylstyrene, p-methylstyrene, divinylbenzene, 1,1-diphenylethylene, N,N-dimethyl-p-aminoethylstyrene, and N,N-diethyl-p-aminoethylstyrene. Among these, styrene is preferable. These vinyl aromatic monomers may be used singly or in combinations of two or more. By allowing the vinyl aromatic monomer unit to comprise a styrene unit, it tends to be more excellent in availability and manufacturability.

The term "mainly comprising" as used herein means that the content of a certain monomer unit is 60% by mass or more. The content of the vinyl aromatic monomer unit in the polymeric block a is preferably 60% by mass or more, more preferably 80% by mass or more, even more preferably 90% by mass or more, and further preferably 95% by mass or more. When the content of the vinyl aromatic monomer unit is in the above-mentioned range, (the phase separation property between the polymeric block a and the polymeric block b is improved), and a molded product having more excellent mechanical properties tends to be obtained.

The content of the polymeric block a in the hydrogenated block copolymer A is 5% to 30% by mass, preferably 10% to 25% by mass, and more preferably 12% to 23% by mass. When the content of the polymeric block a is in the above-mentioned range, the hydrogenated block copolymer tends to be more excellent in manufacturability, and the flexibility, stress-whitening resistance, and transparency of the obtained polyolefin resin composition.

Polymeric Block b

In the polymeric block b, the total of the 1,2-bond content and the 3,4-bond content before hydrogenation is 40% to 90%. The polymeric block b mainly comprises a conjugated diene monomer unit, and at least one polymeric block b is comprised in the hydrogenated block copolymer A. The conjugated diene monomer used in the present embodiment is not particularly limited. An example of the conjugated diene monomer is diolefin having a pair of conjugated double bonds. The type of such a conjugated diene monomer is not particularly limited. Specific examples thereof include: butadienes such as 1,3-butadiene, 2-methyl-1,3-butadiene (isoprene), and 2,3-dimethyl-1,3-butadiene; and 1,3-pentadiene, 2-methyl-1,3-pentadiene, and 1,3-hexadiene. Among these, butadienes are preferable, and 1,3-butadiene is more preferable. These substances may be used singly or in combinations of two or more. By allowing the conjugated diene monomer unit to comprise a butadiene unit, it tends to be more excellent in availability and manufacturability.

The total of the 1,2-bond content and the 3,4-bond content before hydrogenation is 40% to 90%. When the total of the 1,2-bond content and the 3,4-bond content before hydrogenation is 40% to 90%, the obtained polyolefin resin composition tends to be more excellent in flexibility, stress-whitening resistance, and transparency.

In a first aspect, the total of the 1,2-bond content and the 3,4-bond content before hydrogenation is preferably 40% to 60%, more preferably 43% to 58%, and even more preferably 45% to 55%. When the total of the 1,2-bond content and the 3,4-bond content before hydrogenation is in the above-mentioned range, the polymeric block b tends to be more excellent in impact resistance, flexibility at a low temperature, and toughness at a low temperature.

In a second aspect, the total of the 1,2-bond content and the 3,4-bond content before hydrogenation is preferably more than 60% and 90% or less, more preferably 65% to 90%, and even more preferably 70% to 90%. When the total of the 1,2-bond content and the 3,4-bond content before hydrogenation is in the above-mentioned range, the surface smoothness, flexibility, and transparency of the obtained molded product tend to be more excellent.

It is to be noted that the total of the 1,2-bond content before hydrogenation and the 3,4-bond content before hydrogenation can be obtained by the method described in Examples.

The content of the conjugated diene monomer unit in the polymeric block b is preferably 60% by mass or more, more preferably 80% by mass or more, even more preferably 90% by mass or more, and further preferably 95% by mass or more. When the content of the conjugated diene monomer unit is in the above-mentioned range, (the phase separation property between the polymeric block a and the polymeric block b is improved), and a molded product having more excellent mechanical properties tends to be obtained.

The polymeric block b may have an olefinic unsaturated double bond. The hydrogenation rate of the olefinic unsaturated double bond in the polymeric block b is preferably 50% or more, more preferably 65% or more, even more preferably 80% or more, and further preferably 90% or more. When the hydrogenation rate is in the above-mentioned range, the obtained hydrogenated block copolymer or polyolefin resin composition tends to be more excellent in heat resistance, weathering resistance, mechanical strength, flexibility, stress-whitening resistance, transparency, or compatibility with a polyolefin resin such as polypropylene. The upper limit of the hydrogenation rate is not particularly limited, and it is preferably 100%. It is to be noted that the vinyl bond content based on the conjugated diene monomer in the hydrogenated block copolymer or the hydrogenation rate of the hydrogenated block copolymer can be obtained using a nuclear magnetic resonance apparatus (NMR).

In addition, the microstructure (the ratio of cis, trans and vinyl) of the conjugated diene monomer portion can be arbitrarily changed using the after-mentioned polar compound or the like.

Among those described above, the vinyl aromatic monomer unit is commonly a styrene unit, and from the viewpoint of availability and manufacturability, the conjugated diene monomer unit is preferably a butadiene unit.

The content of the polymeric block b in the hydrogenated block copolymer A is preferably 70% to 95% by mass, more preferably 75% to 90% by mass, and even more preferably 77% to 88% by mass. When the content of the polymeric block b is in the above-mentioned range, the hydrogenated block copolymer tends to be more excellent in manufacturability, and the flexibility, stress-whitening resistance, and transparency of the obtained polyolefin resin composition.

Polymeric Block c

The hydrogenated block copolymer A used in the present embodiment may further have a polymeric block c mainly comprising a conjugated diene monomer unit, in which the total of the 1,2-bond content and the 3,4-bond content before hydrogenation is 5% to 30%. By allowing the hydrogenated block copolymer A to comprise the polymeric block c, the compatibility with a polyethylene resin, oil resistance, and stickiness of the hydrogenated block copolymer A tend to be further improved.

The content of the polymeric block c in the hydrogenated block copolymer A is preferably 35% by mass or less, more preferably 30% by mass or less, and even more preferably 25% by mass or less. When the content of the polymeric block c is in the above-mentioned range, the obtained polyolefin resin composition tends to be more excellent in flexibility and transparency.

Polymeric Block d

The hydrogenated block copolymer A used in the present embodiment may further comprise a polymeric block d randomly comprising conjugated diene monomer units and vinyl aromatic monomer units. By allowing the hydrogenated block copolymer A to further comprise the polymeric block d, the scratch resistance and low rebound property of the obtained molded product tend to be further improved. The terms conjugated diene monomer unit and vinyl aromatic monomer unit used herein are not particularly limited, and the same units as those described above can be used herein.

The content of the polymeric block d in the hydrogenated block copolymer A is preferably 35% by mass or less, more preferably 30% by mass or less, and even more preferably 25% by mass or less. When the content of the polymeric block d is in the above-mentioned range, the obtained polyolefin resin composition tends to be more excellent in flexibility and transparency.

Method for Producing Hydrogenated Block Copolymer A

Method for Producing Block Copolymer Before Hydrogenation

The block copolymer before hydrogenation is not particularly limited. For example, it is obtained by performing anionic living polymerization using a lithium initiator in a hydrocarbon solvent. The type of the hydrocarbon solvent is not particular limited. Examples of the hydrocarbon solvent include: aliphatic hydrocarbons such as n-butane, isobutane, n-pentane, n-hexane, n-heptane, and n-octane; alicyclic hydrocarbons such as cyclohexane, cycloheptane, and methylcycloheptane; and aromatic hydrocarbons such as benzene, toluene, xylene, and ethylbenzene.

The type of the lithium initiator is not particularly limited. Examples of the lithium initiator include aliphatic and aromatic lithium hydrogen carbonate compounds containing 1 to 20 carbon atoms. Examples of the lithium compound include a lithium compound containing a single lithium atom in a single molecule thereof, and a dilithium compound, a trilithium compound and a tetralithium compound, in each of which multiple lithium atoms are contained in a single molecule thereof. Specific examples of the lithium compound include n-propyl lithium, n-butyl lithium, sec-butyl lithium, tert-butyl lithium, n-pentyl lithium, n-hexyl lithium, benzyl lithium, phenyl lithium, tolyl lithium, a reaction product of diisopropenylbenzene with sec-butyl lithium, and a reaction product from divinylbenzene, sec-butyl lithium and a small amount of 1,3-butadiene. Among these, n-butyl lithium and sec-butyl lithium are preferable in terms of polymerization activity.

In general, the amount of the lithium initiator used is preferably 0.01 to 0.5 phm (mass part(s) based on 100 parts by mass of monomer), more preferably 0.03 to 0.3 phm, and even more preferably 0.05 to 0.15 phm, although it depends on the molecular weight of a block copolymer of interest.

In the present embodiment, when a conjugated diene monomer and a vinyl aromatic monomer are subjected to block copolymerization using a lithium initiator as a polymerization initiator, a tertiary amine compound can be added as a polar compound to the reaction system. The type of the tertiary amine compound is not particularly limited. A compound represented by the following formula can be used as a tertiary amine compound, for example.

wherein $R^1$, $R^2$, and $R^3$ each represents a hydrocarbon group containing 1 to 20 carbon atoms, or a hydrocarbon group having a tertiary amino group.

Such a compound is not particularly limited. Examples of such a tertiary amine compound include trimethylamine, triethylamine, tributylamine, N,N-dimethylaniline, N-ethylpiperidine, N-methylpyrrolidine, N,N,N',N'-tetramethylethylenediamine, N,N,N',N'-tetraethylethylenediamine, 1,2-dipiperidinoethane, trimethylaminoethylpiperazine, N,N,N',N'',N''-pentamethylethylenetriamine, and N,N'-dioctyl-p-phenylenediamine. Among these, N,N,N',N'-tetramethylethylenediamine is preferable.

The tertiary amine compound is used to increase the vinyl bond content of the polymeric block b before hydrogenation. The amount of the tertiary amine compound used can be regulated, depending on the vinyl bond content of the polymeric block b of interest before hydrogenation (the total of the 1,2-bond content and the 3,4-bond content before hydrogenation). When the vinyl bond content of the polymeric block b before hydrogenation is adjusted to 40% to 90%, the amount of the tertiary amine compound used is not particularly limited, and it is preferably 0.1 to 4 (mol/Li), and more preferably 0.2 to 3 (mol/Li), based on the lithium initiator.

In the present embodiment, sodium alkoxide may be allowed to coexist during block copolymerization. The sodium alkoxide used is not particularly limited. Examples of the sodium alkoxide include compounds represented by the following formula. Among the compounds, sodium alkoxide having an alkyl group containing 3 to 6 carbon atoms is preferable, and sodium t-butoxide and sodium t-pentoxide are more preferable.

wherein R represents an alkyl group containing 2 to 12 carbon atoms.

The amount of the sodium alkoxide used in the present embodiment is preferably 0.010 or more and less than 0.1 (molar ratio), more preferably 0.010 or more and less than 0.08 (molar ratio), even more preferably 0.010 or more and less than 0.06 (molar ratio), and further preferably 0.015 or more and less than 0.05 (molar ratio), based on the tertiary amine compound. When the used amount of the sodium alkoxide is in the above-mentioned range, there can be obtained, at a high production rate, a block copolymer, which comprises a polymeric block b with a high vinyl bond content before hydrogenation and a polymeric block a with a narrow molecular weight distribution, and which also has a narrow molecular weight distribution and high intensity.

In the present embodiment, the method of subjecting a conjugated diene monomer and a vinyl aromatic monomer to block copolymerization using a lithium initiator as a polymerization initiator is not particularly limited. It may be either batch polymerization or continuous polymerization. Otherwise, it may also be a combination thereof. In particular, in order to obtain a block copolymer having a narrow molecular weight distribution and high intensity, a batch polymerization method is preferable. The polymerization temperature is generally from 0° C. to 150° C., preferably from 30° C. to 120° C., and more preferably from 40° C. to 100° C. The time required for polymerization is different depending on conditions. It is generally within 24 hours, and preferably from 0.1 to 10 hours. The atmosphere in the polymerization system is preferably an inert gas atmosphere such as nitrogen gas. The polymerization pressure may be set in a pressure range sufficient for maintaining the monomer and the solvent to be a liquid phase in the above described polymerization temperature range, and thus, it is not particularly limited. Further, it is preferable that impurities that inactivate an initiator and a living polymer, such as water, oxygen and carbon dioxide, be not present in the polymerization system.

In the present embodiment, it is possible that an addition reaction be performed to add a denaturant, so as to add a functional group-containing atomic group to a living end of the block copolymer obtained by the above described method. It is also possible that a coupling agent be allowed to react with the block copolymer obtained by the above described method, so as to couple it. The aforementioned functional group-containing atomic group is not particularly limited. An example of the atomic group is an atomic group containing at least one functional group selected from among a hydroxyl group, a carbonyl group, a thiocarbonyl group, an acid halide group, an acid anhydride group, a carboxyl group, a thiocarboxylic acid group, an aldehyde group, a thioaldehyde group, a carboxylic acid ester group, an amide group, a sulfonic acid group, a sulfonic acid ester group, a phosphoric acid group, a phosphoric acid ester group, an amino group, an imino group, a nitrile group, a pyridyl group, a quinoline group, an epoxy group, a thioepoxy group, a sulfide group, an isocyanate group, an isothiocyanate group, a halogenated silicon group, a silanol group, an alkoxy silicon group, a halogenated tin group, an alkoxy tin group, a phenyl tin group, and the like.

The denaturant having a functional group is not particularly limited. Examples of the denaturant include tetraglycidylmetaxylenediamine, tetraglycidyl-1,3-bisaminomethylcyclohexane, ε-caprolactone, δ-valerolactone, 4-methoxybenzophenone, γ-glycidoxyethyltrimethoxysilane, γ-glycidoxypropyltrimethoxysilane, γ-glycidoxypropyldimethylphenoxysilane, bis(γ-glycidoxypropyl)methylpropoxysilane, 1,3-dimethyl-2-imidazolidinone, 1,3-diethyl-2-imidazolidinone, N,N'-dimethylpropyleneurea, and N-methylpyrrolidone. In the present embodiment, the reaction temperature applied in the addition reaction is preferably 0° C. to 150° C., and more preferably 20° C. to 120° C. The time required for the denaturation reaction is preferably within 24 hours, and more preferably 0.1 to 10 hours, although it is different depending on other conditions.

The type of the coupling agent is not particularly limited. Conventionally known coupling agents can be applied as bifunctional coupling agents. Examples of such a coupling agent include: alkoxy silane compounds such as trimethoxysilane, triethoxysilane, tetramethoxysilane, tetraethoxysilane, dimethyldimethoxysilane, diethyldimethoxysilane, dichlorodimethoxysilane, dichlorodiethoxysilane, trichloromethoxysilane, and trichloroethoxysilane; dihalogen compounds such as dichloroethane, dibromoethane, dimethyldichlorosilane, and dimethyldibromosilane; and acid esters such as methyl benzoate, ethyl benzoate, phenyl benzoate, and phthalic acid ester.

The type of a multifunctional coupling agent, such as a tri- or more functional coupling agent, is not particularly limited. Conventionally known coupling agents can be applied. Examples of such a multifunctional coupling agent include: tri- or more valent polyalcohols; polyvalent epoxy compounds such as epoxidated soybean oil, diglycidyl bisphenol A, and 1,3-bis(N,N'-diglycidylaminomethyl)cyclohexane; halogenated silicon compounds represented by the general formula $R_{4-n}SiX_n$ (wherein R represents a hydrocarbon group containing 1 to 20 carbon atoms, X represents halogen, and n represents an integer of 3 or 4), such as methylsilyl trichloride, t-butylsilyl trichloride, silicon tetrachloride, and their bromide; halogenated tin compounds represented by the general formula $R_{4-n}SnX_n$ (wherein R represents a hydrocarbon group containing 1 to 20 carbon atoms, X represents halogen, and n represents an integer of 3 or 4), such as polyvalent halogen compounds including methyl tin trichloride, t-butyl tin trichloride, and tin tetrachloride. Other examples include dimethyl carbonate and diethyl carbonate.

Hydrogenation Reaction

In the present embodiment, a preferred hydrogenation catalyst is not particularly limited. Examples of the hydrogenation catalyst include titanocene compounds, reducing organometallic compounds, and mixtures of titanocene compounds and reducing organometallic compounds. As such titanocene compounds, the compounds described in Japanese Patent Laid-Open No. 8-109219 can be used. Specific examples of the titanocene compound include: compounds comprising at least one ligand having a (substituted) cyclopentadienyl skeleton, indenyl skeleton or fluorenyl skeleton, such as biscyclopentadienyltitanium dichloride or monopentamethylcyclopentadienyltitanium trichloride. Examples of the reducing organometallic compound include organoalkaline metal compounds such as organic lithium, organic magnesium compounds, organic aluminum compounds, organic boron compounds, and organic zinc compounds. In the present embodiment, the hydrogenation reaction is carried out in a temperature range generally of 0° C. to 200° C., and more preferably of 30° C. to 150° C.

The pressure of hydrogen used in the hydrogenation reaction is generally 0.1 to 15 MPa, and it is recommended to be preferably 0.2 to 10 MPa, and more preferably 0.3 to 5 MPa. In addition, the time required for the hydrogenation reaction is generally 3 minutes to 10 hours, and preferably 10 minutes to 5 hours. The hydrogenation reaction can be carried out by any one of a batch process, a continuous process, and a combination thereof.

The catalyst residue may be removed from the above obtained hydrogenated block copolymer solution, as necessary, and a copolymer may be then separated from the solution. Examples of the method of separating the solvent from the solution include: a method comprising adding a polar solvent that is a poor solvent with respect to the copolymer, such as acetone or alcohol, to the reaction solution, and precipitating the copolymer so as to collect it; a method comprising adding the reaction solution to boiled water under stirring and then removing the solvent from the reaction solution according to steam stripping so as to collect it; and a method of directly heating the polymer solution to distill the solvent away. To the hydrogenated block copolymer used in the present embodiment, various stabilizers such as phenolic stabilizers, phosphorous stabilizers, sulfur stabilizers, or amine stabilizers can be added.

The hydrogenated block copolymer A used in the present embodiment comprises at least one polymeric block a mainly comprising a vinyl aromatic monomer unit and at least one polymeric block b mainly comprising a conjugated diene monomer unit, in which the total of the 1,2-bond content and the 3,4-bond content before hydrogenation is 40% to 90%, and further, the present hydrogenated block copolymer A may also comprise a polymeric block c and/or a polymeric block d, as necessary. The polymer structure of such a hydrogenated block copolymer A is not particularly limited. Examples of the structure of the hydrogenated block copolymer A include the structures represented by the following formulae.

a-b-a, a-(b-a)$_n$, (a-b)$_n$X, a-b1-a-b2, a-(b1-a)$_n$-b2, b2-a-(b1-a)$_n$-b2, c-b-a, c-a-b, (c-a-b)$_n$X, c-a-b-a, a-c-b-a, a-c-b, (a-c-b)$_n$X, a-d-b, a-d-b-a, (a-d-b)$_n$X, a-b-d, a-b-d-a, (a-b-d)$_n$X, c-d-b-a, d-c-b-a, a-c-b-d, a-d-c-b, (a-d-c-b)$_n$X, a-c-d-b, (a-c-d-b)$_n$X

In the above formulae, a represents a polymeric block a; b, b1, and b2 each represents a hydrogenated polymeric block b; c represents a polymeric block c comprising a hydrogenated conjugated diene monomer unit; and d represents a polymeric block d randomly comprising hydrogenated conjugated diene monomer units and vinyl aromatic monomer units. The boundary of each polymeric block does not need to be necessarily clearly divided. In addition, n represents the number of a repeat in the parentheses, and it is an integer of 1 or greater, and preferably an integer of 1 to 5. X represents a residue of a denaturant or a residue of a coupling agent. Moreover, the mass of a may be identical to or different from one another.

In the present embodiment, in view of blocking resistance, 50% by mass or more of the block copolymer is preferably coupled based on 100% by mass of the block copolymer before coupling. Furthermore, from the viewpoint of the flexibility, stress-whitening resistance, surface smoothness and transparency of the obtained hydrogenated block copolymer or polyolefin resin composition, the structure of the block copolymer is preferably a sequentially polymerized copolymer such as a-b-a and a-b1-a-b2, and more preferably a-b1-a-b2.

Among those above described, it is preferable that the hydrogenated block copolymer A have a tetrablock structure that is polymeric block a—polymeric block b (b1)—polymeric block a—polymeric block b (b2).

The content of b2 is preferably 0.5% to 9% by mass, more preferably 1% to 7.5% by mass, and even more preferably 2% to 6% by mass, based on 100% by mass of the hydrogenated block copolymer A. In addition, the mass of b1 is greater than the mass of b2, preferably by 50% by mass or more, more preferably by 60% by mass, and even more preferably by 65% by mass, based on 100% by mass of the b2.

By using a hydrogenated block copolymer comprising such a structure, when the polyethylene powder B is used as a dusting agent to be applied to the hydrogenated block copolymer, the polyethylene powder is not completely incorporated into the hydrogenated block copolymer. This provides good surface property, and further, the hydrogenated block copolymer tends to have excellent compatibility with a polyolefin resin. Thereby, the obtained molded product tends to be more excellent in transparency, stress-whitening resistance, flexibility, and processability.

The weight average molecular weight of the block copolymer used in the present embodiment is preferably 40,000 to 500,000, and more preferably 50,000 to 300,000. Moreover, the molecular weight distribution of a single peak measured by gel permeation chromatography (GPC) is preferably 1.3 or less, more preferably 1.2 or less, even more preferably 1.1 or less, and further preferably 1.08 or less. It is to be noted that the molecular weights of the hydrogenated block copolymer and the polymeric block a each indicates a weight average molecular weight that is obtained based on a peak of a chromatogram measured by GPC and a calibration curve obtained by measuring commercially available standard polystyrene (produced using a peak molecular weight of standard polystyrene). Likewise, the molecular weight distributions of the hydrogenated block copolymer and the polymeric block a can be each obtained by the measurement by GPC. The molecular weight distribution indicates the ratio between a weight average molecular weight and a number average molecular weight. The number average molecular weight, the weight average molecular weight, and the molecular weight distribution can be obtained by the methods described in Examples.

From the viewpoint of the productivity and formability of the hydrogenated block copolymer, the melt flow rate (ASTM D1238: 230° C., 2.16 Kg loaded) of the hydrogenated block copolymer used in the present embodiment is preferably 0.5 to 60 (measurement unit: g/10 minutes), more preferably 1 to 55, even more preferably 2 to 50, and further preferably 3 to 45. The melt flow rate can be obtained by the method described in Examples.

From flexibility and blocking-preventing effect, the hardness (JIS-A) of the hydrogenated block copolymer used in the present embodiment is 30° to 67°, preferably 30° to 65°, and more preferably 35° to 60°. The hardness can be obtained by the method described in Examples.

Pellet Molded Product of Hydrogenated Block Copolymer A

The above obtained hydrogenated block copolymer A is subjected to pelletizing. Pelletizing can be carried out by a conventionally known method. Examples of the pelletizing method include: a method comprising extruding the hydrogenated block copolymer A into a strand shape through a single screw or twin screw extruder, then cooling it with water or in air, and then cutting the resultant with a strand cutter; a method comprising establishing a rotation cutter to the front of a die portion of a single screw or twin screw extruder, and then cutting a strand-shaped hydrogenated block copolymer A immediately after extruded through the die in a water flow or in water; and a method comprising melt mixing the hydrogenated block copolymer A using an open roll and a Banbury mixer, molding the resultant into a sheet shape using a roll, cutting the sheet into a strip shape, and cutting it into cuboidal pellets using a pelletizer. It is to be noted that the size and shape of a pellet molded product of the hydrogenated block copolymer A are not particularly limited.

The term "pellet molded product" is used not only to mean a pellet-shaped molded product, but also to mean a clamshaped molded product. A clam-shaped hydrogenated block copolymer A can be prepared by a conventionally known method. An example of the method is a method of obtaining a clam-shaped hydrogenated block copolymer A by removing a solvent from a solution or slurry of the hydrogenated block copolymer A by steam stripping. It is to be noted that the size and shape of such a clam-shaped hydrogenated block copolymer A are not particularly limited.

Polyethylene Powder B

The polyethylene powder B used in the present embodiment has a number average molecular weight of 15,000 or less, an average particle size of 1 to 15 μm, and an angle of repose of 45° to 70°. The powder B is polyethylene powder, and it is preferably homopolyethylene powder, and more preferably high-density polyethylene powder. By using such powder, the obtained molded product is excellent in surface smoothness, transparency, low bleed-out property on the surface of a molded product, low precipitation property obtained when used under high pH conditions, and low combustion ash content.

The amount of the residual metal derived from a polyethylene catalyst contained in the polyethylene powder B is preferably 30 ppm or less, more preferably 25 ppm or less, and even more preferably 20 ppm or less. The type of the residual metallic component is not particularly limited. Examples of the metallic component include Ti, Mg, Fe, AL, Ca, and a compound comprising the same. When the amount of the residual metal is 30 ppm or less, the obtained molded product tends to be more excellent in low bleed-out property on the surface, low precipitation property obtained when used under high pH conditions, low combustion ash content, and safety (with intended uses for food products and/or medical products). The amount of the residual metal can be obtained by the method described in Examples.

The amount of the residual oligomer contained in the polyethylene powder B is preferably 0.3 wt % or less, more preferably 0.25 wt % or less, and even more preferably 0.2 wt % or less. When the amount of the residual oligomer is 0.3 wt % or less, the obtained molded product tends to be more excellent in low bleed-out property on the surface, low combustion ash content, and safety (with intended uses for food products and/or medical products). The amount of the residual oligomer can be obtained by the method described in Examples.

The ash content in the polyethylene powder B is preferably 0.01 wt % or less, more preferably 0.08 wt % or less, and even more preferably 0.06 wt % or less. When the ash content is 0.008 wt % or less, the obtained molded product tends to be more excellent in low bleed-out property on the surface, low combustion ash content, and safety (with intended uses for food products and/or medical products). The ash content can be obtained by the method described in Examples.

The polyethylene powder B preferably does not contain impurities (stabilizers, etc.), other than metallic components, residual oligomers, and ash contents. Thereby, the obtained molded product tends to be more excellent in low bleed-out property on the surface, low precipitation property obtained when used under high pH conditions, low combustion ash content, and safety (with intended uses for food products and/or medical products).

The shear modulus G' at 40° C. of polyethylene contained in the polyethylene powder B, which is obtained by measuring dynamic viscoelasticity at a frequency of 1 Hz, is preferably 500 MPa or more. By using such polyethylene, the polyethylene powder B tends to be more excellent in blocking-preventing effect.

The melting point of the polyethylene powder B is preferably 110° C. or higher, more preferably 115° C. or higher, even more preferably 117° C. or higher, further preferably 120° C. or higher, and most preferably 123° C. or higher. When the melting point of the polyethylene powder B is in the above-mentioned range, the polyethylene powder B tends to be more excellent in blocking-preventing effect. The melting point of the polyethylene powder B can be obtained by the method described in Examples.

The density of the polyethylene powder B is preferably 0.94 or more, more preferably 0.95 or more, and even more preferably 0.96 or more. When the density of the polyethylene powder B is in the above-mentioned range, the polyethylene powder B tends to be more excellent in blocking-preventing effect.

The number average molecular weight of the polyethylene powder B is 15,000 or less, preferably 1,000 to 15,000, more preferably 1,000 to 10,000, even more preferably 1,000 to 5,000, and further preferably 1,000 to 3,000. When the number average molecular weight of the polyethylene powder B is 15,000 or less, the polyethylene powder B tends to be more excellent in blocking-preventing effect and the surface smoothness and transparency of the obtained molded product.

The number of peaks in the molecular weight distribution curve may be either one or two or more, if the number average molecular weight is 15,000 or less. When the number of peaks in the molecular weight distribution curve is one, the molecular weight distribution is preferably 1.5 to 5, more preferably 2 to 4.5, even more preferably 2.5 to 4, and further preferably 3 to 3.8. When a plurality of peaks are found in the molecular weight distribution curve, if the total number average molecular weight is 15,000 or less, the polyethylene powder B may contain 30% by mass or less of peak components having a number average molecular weight of 20,000 to 300,000. By using such polyethylene powder B, the polyethylene powder B tends to be more excellent in in blocking-preventing effect and the surface smoothness and transparency of the obtained molded product.

The molecular weight of the polyethylene powder B indicates a number average molecular weight obtained from the molecular weight of a chromatogram peak obtained by the measurement by GPC, based on a calibration curve obtained by the measurement of commercially available standard polystyrene (produced using the peak molecular weight of standard polystyrene). The molecular weight distribution of the polyethylene powder B can also be obtained by the measurement by GPC, and it indicates the ratio between the weight average molecular weight and the number average molecular weight.

Moreover, the average particle diameter is 1 to 15 μm, preferably 1 to 10 μm, and more preferably 2 to 8 μm. When the average particle diameter is in the above-mentioned range, the polyethylene powder B used as the dusting agent to be applied to the hydrogenated block copolymer is excellent in prevention of blocking among the pellet molded products of the hydrogenated block copolymer A, namely, the effect of preventing blocking among hydrogenated block copolymer pellets X, and the stress-whitening resistance, transparency and the like of a molded product of a polyolefin resin composition.

Furthermore, the maximum particle diameter (<99.9%) of the polyethylene powder B is preferably 30 μm or less, more preferably 28 μm or less, even more preferably 26 μm or less, and further preferably 24 μm or less. When the maximum particle diameter is in the above-mentioned range, the polyethylene powder B used as the dusting agent to be applied to the hydrogenated block copolymer is excellent in prevention of blocking among the pellet molded products of the hydrogenated block copolymer A, namely, the effect of preventing blocking among hydrogenated block copolymer pellets X, and the stress-whitening resistance, transparency and the like of a molded product of a polyolefin resin composition.

The "average particle diameter" and "maximum particle diameter" are measured using a laser diffraction/scattering grain size distribution measuring apparatus, and further, the term "average particle diameter" is used to mean a particle diameter that provides an integration value of 50% in the mass distribution of measurement values. The average particle diameter and the maximum particle diameter can be measured by the method described in Examples.

The angle of repose of the polyethylene powder B is 45° to 70°, preferably 50° to 65°, and more preferably 52° to 62°. When the angle of repose of the polyethylene powder B is in the above-mentioned range, the polyethylene powder B is more excellent in prevention of blocking among the pellet molded products of the hydrogenated block copolymer A, and further, in the effect of preventing blocking among hydrogenated block copolymer pellets X (easy entangling in the hydrogenated block copolymer pellet A) and the stability of feeding the polyethylene powder B. The angle of repose can be measured by the method described in Examples.

Method of Producing Polyethylene Powder B

The method of producing the polyethylene powder B is not particularly limited. A conventionally known method can be applied. Examples of the production method include chemical crushing, in which polyethylene is dissolved in a solvent and is then crushed, and jet mill crushing.

Method of Producing Hydrogenated Block Copolymer Pellet X

Moreover, the method of mixing a pellet molded product of the hydrogenated block copolymer A with the polyethylene powder B is not particularly limited. Examples of the mixing method include: a method of mixing the two substances using a mixer such as a tumbler; a method of allowing a dispersion prepared by dispersing the polyethylene powder B in water in the presence or absence of a surfactant to come into contact with a pellet of the hydrogenated block copolymer A; and a method comprising a step of extruding the hydrogenated block copolymer A into a strand shape through an extruder, cooling the strand with water, and cutting the resulting strand with a strand cutter, wherein a dispersion of the polyethylene powder B is added into the cooling water.

By using the above-obtained polyethylene powder B and the tetrablock structure a-b1-a-b2 of the hydrogenated block copolymer A, the obtained polyolefin resin composition tends to be more excellent in the balance among flexibility, stress-whitening resistance, surface smoothness, and transparency.

Polyolefin Resin Composition

The polyolefin resin composition according to the present embodiment comprises the above described hydrogenated block copolymer pellet X and a polyolefin resin C, and the hydrogenated block copolymer pellet X/the polyolefin resin (hereinafter also referred to as "X/C")=3 to 97 parts by mass/97 to 3 parts by mass. The X/C is 3 to 97 parts by mass/97 to 3 parts by mass, preferably 10 to 90 parts by mass/90 to 10 parts by mass, and more preferably 20 to 80 parts by mass/80 to 20 parts by mass, although it depends on the required performance of the intended use. When the X/C is in the above-mentioned range, the polyolefin resin composition tends to be more excellent in the balance between flexibility and mechanical properties.

The polyolefin resin C is not particularly limited. For example, a polypropylene resin is preferable. By allowing the polyolefin resin to comprise polypropylene, the polyolefin resin composition tends to be more excellent in flexibility, stress-whitening resistance, and transparency.

The used polypropylene resin is not particularly limited. Examples of the polypropylene resin include a crystalline propylene homopolymer, a crystalline ethylene-propylene copolymer, and a crystalline propylene-a-olefin copolymer. These may be used singly or in combinations of two or more.

The crystalline ethylene-propylene copolymer is not particularly limited. For example, it is a crystalline ethylene-propylene block copolymer of a propylene homopolymer portion and an ethylene-propylene random copolymer portion.

The a-olefin used in the crystalline propylene-α-olefin copolymer is not particularly limited. It is, for example, α-olefin containing 4 or more carbon atoms, preferably α-olefin containing 4 to 20 carbon atoms, and more preferably α-olefin containing 4 to 12 carbon atoms. The type of such α-olefin is not particularly limited. Examples of such α-olefin include butene-1, pentene-1, hexene-1, heptene-1, octene-1, and decene-1. The crystalline propylene-α-olefin copolymer is not particularly limited. Examples thereof include a crystalline propylene-butene-1 copolymer and a crystalline propylene-hexene-1 copolymer.

Among these, a crystalline propylene homopolymer, a crystalline ethylene-propylene block copolymer, or a mixture thereof is preferable.

In the present embodiment, the ash content in the polyolefin resin composition after combustion is preferably 0.05% by mass or less, more preferably 0.04% by mass or less, and even more preferably 0.03% by mass or less.

Molded Product

The molded product according to the present embodiment comprises the hydrogenated block copolymer pellet X or the above described polyolefin resin composition. The molded product according to the present embodiment can be utilized as an injection-molded product, a hollow-molded product, a pressure-molded product, a vacuum-molded product, an extrusion-molded product, etc., having various forms such as a sheet, a film and a tube. In particular, the molded product according to the present embodiment comprising the polypropylene resin composition is excellent in the balance between flexibility and stress-whitening resistance, has no precipitation, such as bleeding-out, on the surface of the molded product, and has no precipitation even when it is used under high pH conditions. Also, this molded product has low combustion ash content and is excellent in roughness and transparency. Thus, the present molded products can be widely used for automobile products, architectural products, various types of wrapping materials, commodities, etc. Among others, the present molded products can be preferably used as various types of wrapping materials such as a sheet and a film, molded products used for food products, molded products for medical use, such as a tube and a transfusion bag, molded products used for non-woven materials and/or hygiene products such as disposable diapers and/or sanitary products, and molded products used for optical materials.

EXAMPLES

Hereinafter, the present embodiment will be specifically described in the following examples. However, these examples are not intended to limit the present embodiment. In the below-described Examples and Comparative Examples, by the after-mentioned methods, hydrogenated block copolymers were prepared, and polyolefin resin compositions were then produced. After that, comparisons were made among them in terms of physical properties. Upon making comparisons, the properties of hydrogenated block copolymers and the physical properties of polyolefin resin compositions were measured as follows.

Measurement Methods

1) Content of polymeric block a (hereinafter also referred to as "styrene content"), the total of the 1,2-bond content and the 3,4-bond content before hydrogenation (hereinafter also referred to as "the vinyl bond content of conjugated diene"), and hydrogenation rate of unsaturated bond based on conjugated diene compound The content of the polymeric block a (styrene content), the total of the 1,2-bond content and the 3,4-bond content before hydrogenation (the vinyl bond content of a conjugated diene), and the hydrogenation rate of an unsaturated bond based on a conjugated diene compound were measured by nuclear magnetic resonance spectrum analysis (NMR). JNM-LA400 (manufactured by JEOL, trade name) was used as a measurement apparatus, deuterated chloroform was used as a solvent, and the concentration of a sample was set at 50 mg/mL. The observing frequency was set at 400 MHz, and TMS (tetramethylsilane) was used as a chemical shift standard. The pulse delay was set at 2.904 seconds, the number of scanning was set at 64, the pulse width was set at 45°, and the measurement temperature was set at 26° C. Under these conditions, measurements were carried out.

2) Measurement of number average molecular weight, weight average molecular weight, molecular weight distribution, and coupling ratio The number average molecular weight and weight average molecular weight of the hydrogenated block copolymer A were measured by GPC measurement (apparatus: LC-10 (manufactured by Shimadzu Corporation, trade name), column: 2×TSKgel GMHXL (4.6 mm ID×30 cm), solvent: tetrahydrofuran), and they were each obtained as a molecular weight relative to polystyrene, using commercially available standard polystyrene. In addition, the molecular weight distribution of the hydrogenated block copolymer A was obtained as the ratio between the obtained weight average molecular weight and number average molecular weight. Moreover, the coupling ratio of the hydrogenated block copolymer A was obtained using the peak area before coupling and the peak area after coupling in the molecular weight distribution measured by GPC.

Furthermore, the number average molecular weight and weight average molecular weight of the resin polymer powder B were each obtained as a molecular weight relative to polystyrene, using commercially available standard polystyrene, by GPC measurement (apparatus: HLC-8121 (Tosoh Corporation, trade name), column: 2×TSKgel GMHHR-H (20)HT (7.8 mm ID×30 cm), solvent: o-dichlorobenzene (DCB)). Further, the molecular weight distribution of the resin polymer powder B was obtained as the ratio between the obtained weight average molecular weight and number average molecular weight.

3) Melt flow rate (hereinafter also referred to as "MFR")

The MFR of the hydrogenated block copolymer A was measured in accordance with ASTM D1238, at 230° C. at a load of 2.16 Kg.

4) Hardness (JIS-A) of hydrogenated block copolymer A

Four sheets, which were obtained in Examples 1 to 4 and Comparative Examples 1 to 11, were laminated in accordance with JIS K6253, and a momentary value was then measured using Durometer type A.

5) Melting point

The melting point of the resin polymer powder B was measured using a differential scanning calorimeter (DSC, MAC Science DSC3200S).

6) Amount of residual metal

The amount of metal remaining in the resin polymer powder B was measured by elementary analysis using Inductivity coupled plasma (ICP) (manufactured by Shimadzu Corporation, ICPS-7510).

7) Average particle diameter and maximum particle diameter

The average particle diameter and maximum particle diameter of the resin polymer powder B were measured using a laser diffraction/scattering grain size distribution measuring apparatus (manufactured by Shimadzu Corporation, SALD-300V).

8) Angle of repose

The angle of repose of the resin polymer powder B was measured by an injection method in accordance with JIS R-9301-2.

9) Ash content

The resin polymer powder B was added into a porcelain crucible, and was then weighed. Thereafter, it was incinerated at 750° C. for 6 hours in an electric furnace. The ash content was obtained according to the following calculation formula:

Ash content (%)=[Ash weight (g)/resin polymer powder B weight (g)]×100

10) Amount of oligomer

The amount of oligomer in the resin polymer powder B was obtained by extracting the resin polymer powder B with methanol by Soxhlet extraction method, and then analyzing the obtained extract by GC/MS (Agilent Technologies 6890/5973MSD) and the measurement of the weight of the extract.

11) Blocking test method

The blocking resistance of the hydrogenated block copolymer pellet X obtained in each of Examples 1 to 4 and Comparative Examples 1 to 11 was evaluated by placing 60 g of a pellet of a hydrogenated block copolymer A and a predetermined amount of resin polymer powder B into a polyethylene bag, fully stirring it, transferring the resultant to a cylindrical metal vessel with a diameter of 6 cm, applying a load of 1160 g thereto, followed by leaving it at rest at 60° C. for 20 hours, then removing the pellet from the metal vessel, then stirring it, and then measuring the ratio of the weight of three or more blocking pellets.

12) Hardness (JIS-A) of hydrogenated block copolymer pellet X

Four sheets, which were obtained in Examples 1 to 4 and Comparative Examples 1 to 11, were laminated in accordance with JIS K6253, and a momentary value was then measured using Durometer type A.

13) Transparency

The sheets obtained in Examples 1 to 4 and Comparative Examples 1 to 11 and the films obtained in Examples 5 to 8 and Comparative Examples 12 to 22 were each measured in terms of haze, using the apparatus "NDH-1001DP" manufactured by Nippon Denshoku Industries Co., Ltd., and they were then evaluated.

14) Tensile elasticity

In accordance with JIS K6251, the films obtained in Examples 5 to 8 and Comparative Examples 12 to 22 were each punched into a JIS No. 5 test piece, and the tensile elasticity was then measured at a tensile rate of 200 mm/min.

15) Method of evaluating stress-whitening resistance (resistance to whitening on bending)

The films obtained in Examples 5 to 8 and Comparative Examples 12 to 22 were each cut into a piece of 5 cm long and 1 cm wide. Each piece was completely bended by 180° in a longitudinal direction, and it was then turned back to the original position. Thereafter, the degree of whitening was determined by visual observation.

○: The piece is not whitened.
Δ: A slight line remains.
x: A clear white line remains.

16) Surface smoothness

The surface roughness of each of the films obtained in Examples 5 to 8 and Comparative Examples 12 to 22 was measured using a laser microscope (manufactured by Keyence Corporation; VK-X8500) (10-point average roughness: Rz).

17) Bleeding resistance

The sheets obtained in Examples 1 to 4 and Comparative Examples 1 to 11 and the films obtained in Examples 5 to 8 and Comparative Examples 12 to 22 were each cut into a piece of 5 cm long and 1 cm wide. Each piece was bended by 180° in a longitudinal direction, and it was then fixed with a clip. The piece was left in an atmosphere at room temperature or at 121° C. for 24 hours. Thereafter, the presence or absence of the bleeding and blooming of the low-molecular-weight product was observed by visual inspection, and it was then evaluated based on the following standards.

○: Completely no bleeding is observed.
Δ: Slight bleeding is observed.
x: Bleeding is observed.

18) Precipitation property under high pH conditions

The films obtained in Examples 5 to 8 and Comparative Examples 12 to 22 were each cut into a piece of 10 cm long and 5 cm wide. The obtained two films were placed in a 300-mL glass vessel, and they were then heated at 121° C. for 20 minutes. Thereafter, 200 mL of a potassium hydroxide aqueous solution (pH 8.5) was exactly placed in the glass vessel, and the vessel was then hermetically closed. The vessel was left at room temperature for 1 week, and thereafter, the presence or absence of a precipitate was observed by visual inspection, and it was then evaluated based on the following standards.

○: Completely no precipitation is observed.
Δ: Slight precipitation is observed.
x: Precipitation is observed.

19) Combustion ash content 2 g of each of the sheets obtained in Examples 1 to 4 and Comparative Examples 1 to 11 and the films obtained in Examples 5 to 8 and Comparative Examples 12 to 22 was used as a sample. Each sample was placed in a porcelain crucible, and was then weighed. Thereafter, the sample was incinerated in an electric furnace at 750° C. for 6 hours. The ash content was calculated according to the following calculation formula:

Ash content (%)=[Ash weight (g)/sample weight (g)]× 100

20) Dart Impact Test

Using a dart impact tester manufactured by Toyo Seiki, in accordance with JIS K7124, the films obtained in Examples 5 to 8 and Comparative Examples 12 to 22 were each cut into a test piece of 30 cm long and 30 cm wide, and a dart impact test was then carried out. The obtained impact strength was evaluated based on the following standards.

That is to say, the impact strength was measured under conditions of missile diameter=50 mm, missile weight=2.2 kg, and height of falling weight=45 cm to 150 cm.

◉: Impact strength of 32 J or more
○: Impact strength of 28 J or more and less than 32 J
x: Impact strength of less than 28 J Used Materials The following hydrogenated block copolymer A, powder B, and polypropylene resin C were used in the examples and the comparative examples.

Hydrogenated Block Copolymer A

Preparation of Hydrogenation Catalyst

A hydrogenation catalyst used in the hydrogenation reaction of the hydrogenated block copolymer A was prepared by the following method. 1 L of cyclohexane, which had been dried and purified, was added into a nitrogen-substituted reaction vessel, and 100 mmol of bis(η5-cyclopentadienyl)titanium dichloride was then added thereto. While the obtained mixture was fully stirred, an n-hexane solution containing 200 mmol of trimethyl aluminum was added thereto. The thus obtained mixture was reacted at room temperature for approximately 3 days.

Preparation of Hydrogenated Block Copolymer A

A-1

Using a stirring apparatus with an internal volume of 10 L and a tank reactor equipped with a jacket, batch polymerization was carried out. First, 1 L of cyclohexane was added to the reaction vessel. Then, 0.065 parts by mass of n-butyl lithium (hereinafter referred to as "Bu—Li") was added based on 100 parts by mass of total monomers; 1.8 mol of N,N,N',N'-tetramethylethylenediamine (hereinafter also referred to as "TMEDA") was added based on 1 mol of Bu—Li; and 0.04 mol of sodium t-pentoxide (hereinafter referred to as "NaOAm") was added based on TMEDA. As a first step, a cyclohexane solution (concentration: 20% by mass) containing 6.5 parts by mass of styrene was added to the vessel over 10 minutes, and then, polymerization was carried out for further 10 minutes (wherein the temperature was controlled to 60° C. during the polymerization). Subsequently, as a second step, a cyclohexane solution (concentration: 20% by mass) containing 82 parts by mass of butadiene was added to the vessel over 60 minutes, and then, polymerization was carried out for further 10 minutes (wherein the temperature was controlled to 60° C. during the polymerization). Subsequently, as a third step, a cyclohexane solution (concentration: 20% by mass) containing 6.5 parts by mass of styrene was added to the vessel over 10 minutes, and then, polymerization was carried out for further 10 minutes (wherein the temperature was controlled to 60° C. during the polymerization). Subsequently, as a fourth step, a cyclohexane solution (concentration: 20% by mass) containing 5 parts by mass of butadiene was added to the vessel over 5 minutes, and then, polymerization was carried out for further 10 minutes (wherein the temperature was controlled to 60° C. during the polymerization).

With regard to the obtained block copolymer, the styrene content was 13% by mass, the vinyl bond content of a butadiene block part before hydrogenation was 78%, the weight average molecular weight was 160,000, and the molecular weight distribution was 1.05.

Subsequently, the above described hydrogenation catalyst, 100 ppm of titanium, was added to 100 parts by mass of the obtained block copolymer, and a hydrogenation reaction was then carried out under a hydrogen pressure of 0.7 MPa and at a temperature of 70° C. Thereafter, methanol was added to the reaction product, and 0.3 parts by mass of octadecyl-3-(3,5-di-t-butyl-4-hydroxyphenyl)propionate was added as a stabilizer to 100 parts by mass of the block polymer. The hydrogenation rate of the obtained hydrogenated block copolymer (A-1) was 98%, and the MFR thereof was 5 g/10 minutes. The analysis results of the obtained hydrogenated block copolymer (A-1) are shown in Table 1.

A-2

A hydrogenated block copolymer (A-2) was produced in the same manner as that of the hydrogenated block copolymer (A-1). However, the amount of Bu—Li added to 100 parts by mass of total monomers was set at 0.11 parts by mass, the amount of TMEDA added to 1 mol of Bu—Li was set at 0.45 mol, NaOAm was not added, the amount of styrene used in the first and third steps was set at 9 parts by mass, the amount of butadiene used in the second step was set at 79 parts by mass, and the amount of butadiene used in the fourth step was set at 3 parts by mass.

With regard to the obtained hydrogenated block copolymer (A-2), the styrene content was 18% by mass, the vinyl bond content of a butadiene block part before hydrogenation was 52%, the weight average molecular weight was 110,000, and the molecular weight distribution was 1.03. In addition, the hydrogenation rate of the obtained hydrogenated block copolymer (A-2) was 99%, and the MFR thereof was 4 g/10 minutes. The analysis results of the obtained hydrogenated block copolymer (A-2) are shown in Table 1.

A-3

A hydrogenated block copolymer (A-3) was produced in the same manner as that of the hydrogenated block copolymer (A-2). However, the amount of Bu—Li added to 100 parts by mass of total monomers was set at 0.13 parts by mass, the amount of TMEDA added to 1 mol of Bu—Li was set at 0.65 mol, NaOAm was not added, the amount of styrene used in the first and third steps was set at 9 parts by mass, and the amount of butadiene used in the second step was set at 82 parts by mass.

With regard to the obtained hydrogenated block copolymer (A-3), the styrene content was 18% by mass, the vinyl bond content of a butadiene block part before hydrogenation was 60%, the weight average molecular weight was 130,000, and the molecular weight distribution was 1.04. In addition, the hydrogenation rate of the obtained hydrogenated block copolymer (A-3) was 99%, and the MFR thereof was 6 g/10 minutes. The analysis results of the obtained hydrogenated block copolymer (A-3) are shown in Table 1.

A-4

A hydrogenated block copolymer (A-4) was produced in the same manner as that of the hydrogenated block copolymer (A-2). However, the amount of Bu—Li added to 100 parts by mass of total monomers was set at 0.13 parts by mass, the amount of TMEDA added to 1 mol of Bu—Li was set at 0.3 mol, the amount of styrene used in the first and third steps was set at 16 parts by mass, and the amount of butadiene used in the second step was set at 68 parts by mass. The hydrogenated block copolymer (A-4) had a-b-a structure (triblock structure).

With regard to the obtained hydrogenated block copolymer (A-4), the styrene content was 32% by mass, the vinyl bond content of a butadiene block part before hydrogenation was 35%, the weight average molecular weight was 80,000, and the molecular weight distribution was 1.03. In addition, the hydrogenation rate of the obtained hydrogenated block copolymer (A-4) was 99%, and the MFR thereof was 3 g/10 minutes. The analysis results of the obtained hydrogenated block copolymer (A-4) are shown in Table 1.

A-5

A hydrogenated block copolymer (A-5) was produced in the same manner as that of the hydrogenated block copolymer (A-4). However, the amount of Bu—Li added to 100 parts by mass of total monomers was set at 0.15 parts by mass, the amount of TMEDA added to 1 mol of Bu—Li was set at 1.5 mol, the amount of styrene used in the first step was set at 33 parts by mass, and the amount of butadiene used in the second step was set at 67 parts by mass. After completion of the polymerization with a a-b structure (diblock structure), a cyclohexane solution of ethyl benzoate used as a bifunctional coupling agent was added to the reaction product, such that the amount of the ethyl benzoate could be a molar equivalent of 0.38 times the amount of Bu—Li (1 mol). Thereafter, while the temperature in the reaction vessel was adjusted to 70° C., the reaction was carried out for 10 minutes.

With regard to the obtained hydrogenated block copolymer (A-5), the styrene content was 33% by mass, the vinyl bond content of a butadiene block part before hydrogenation was 75%, the coupling ratio was 40%, the weight average molecular weight was 100,000, and the molecular weight distribution was 1.71. In addition, the hydrogenation rate of the obtained hydrogenated block copolymer (A-5) was 45%, and the MFR thereof was 18 g/10 minutes. The analysis results of the obtained hydrogenated block copolymer (A-5) are shown in Table 1.

TABLE 1

|  |  | A-1 | A-2 | A-3 | A-4 | A-5 |
|---|---|---|---|---|---|---|
| Styrene content | (wt %) | 13 | 18 | 18 | 32 | 33 |
| Vinyl bond content of conjugated diene | (%) | 78 | 52 | 60 | 35 | 75 |
| Hydrogenation rate of unsaturated bond | (%) | 98 | 99 | 99 | 99 | 45 |
| MFR | (g/10 min) | 5 | 4 | 6 | 3 | 18 |
| Hardness | (JIS A) | 42 | 60 | 66 | 79 | 73 |
| Coupling ratio | (%) | — | — | — | — | 40 |

Resin Polymer Powder B (Dusting Agent)

The used resin polymer dusting powder (dusting agents) are shown in Table 2.

B-1: polyethylene powder (hereinafter also referred to as "PE"), average particle diameter: 4 μm (manufactured by Seishin Enterprise Co., Ltd.)

B-2: polyethylene powder, average particle diameter: 7 μm (manufactured by Seishin Enterprise Co., Ltd.)

B-3: polyethylene powder, average particle diameter: 17 μm (manufactured by Seishin Enterprise Co., Ltd.)

B-4: polyethylene powder, average particle diameter: 11 μm (manufactured by Seishin Enterprise Co., Ltd.)

B-5: polyethylene powder, average particle diameter: 25 μm (manufactured by Seishin Enterprise Co., Ltd.)

B-6: polypropylene powder (hereinafter also referred to as "PP"), average particle diameter: 18 μm (manufactured by Seishin Enterprise Co., Ltd.)

B-7: polypropylene powder, average particle diameter: 8 μm (manufactured by Seishin Enterprise Co., Ltd.)

B-8: calcium stearate (hereinafter also referred to as "Cast"), average particle diameter: 11 μm (manufactured by NOF CORPORATION)

B-9: ethylenebisstearylamide (hereinafter also referred to as "EBS"), average particle diameter: 18 μm (manufactured by NOF CORPORATION)

TABLE 2

|  |  | B-1 | B-2 | B-3 | B-4 | B-5 | B-6 | B-7 | B-8 | B-9 |
|---|---|---|---|---|---|---|---|---|---|---|
| Type |  | PE | PE | PE | PE | PE | PP | PP | Cast | EBS |
| Melting point | (° C.) | 121 | 126 | 105 | 115 | 105 | 160 | 145 | 156 | 145 |
| Residual metal amount | (ppm) | 3.7 | 18 | 0.8 | 81.5 | 0.8 | 119.3 | 35 | — | — |
| Number average molecular weight | (Mn) | 4500 | 2200 | 32000 | 16000 | 32000 | 4800 | 2500 | — | — |
| Average particle diameter | (μm) | 4 | 7 | 17 | 11 | 25 | 18 | 8 | 11 | 18 |
| Maximum particle diameter | (μm) | 13 | 22 | 61 | 44 | 87 | 64 | 28 | — | — |
| Angle of repose | (°) | 59 | 58 | 47 | 57 | 43 | 54 | 62 | — | — |
| Ash content | % | 0.002 | 0.007 | 0.001 | 0.01 | 0.001 | 0.012 | 0.009 | 9.5 | — |
| Oligomer amount | % | 0.12 | 0.17 | 0.023 | 0.33 | 0.023 | 0.22 | 0.35 | — | — |

Polyolefin Resin C

Random PP resin (manufactured by Japan Polypropylene Corporation, trade name: "Novatec EG6D")

Examples 1 to 4 and Comparative Examples 1 to 11

A pellet of the hydrogenated block copolymer A was mixed with the powder B at a mixing ratio of A/B=100/0.5 using a tumbler, so as to obtain hydrogenated block copolymer pellets X1 to X13. The obtained hydrogenated block copolymer pellets X were subjected to compression molding, so as to produce a sheet with a thickness of 2 mm. The evaluation results of the hydrogenated block copolymer pellets X are shown in Table 3.

It is to be noted that the hydrogenated block copolymer pellets X of Examples 1 to 4 were each washed with methanol, and the methanol was then evaporated, so as to recover polyethylene powder B. Thereby, it was confirmed that the polyethylene powder B adhered to the surface of the pellet of the hydrogenated block copolymer A.

TABLE 3

|  |  | Ex. 1 X1 | Ex. 2 X2 | Comp. Ex. 1 X3 | Comp. Ex. 2 X4 | Comp. Ex. 3 X5 | Comp. Ex. 4 X6 | Comp. Ex. 5 X7 | Comp. Ex. 6 X8 |
|---|---|---|---|---|---|---|---|---|---|
| Hydrogenated block copolymer A | Type | A-1 | A-1 | A-1 | A-1 | A-1 | A-1 | A-1 | A-1 |
|  | Additive amount | 100 | 100 | 100 | 100 | 100 | 100 | 100 | 100 |
| Resin polymer powder B | Type | B-1 | B-2 | — | B-2 | B-3 | B-4 | B-5 | B-6 |
|  | Additive amount | 0.5 | 0.5 | 0 | 1.8 | 0.5 | 0.5 | 0.5 | 0.5 |
| Blocking resistance | (%) | 0.7 | 0.9 | 99 | 0.1 | 42 | 25 | 85 | 5.3 |
| Transparency | Haze | 4.4 | 4.5 | 4.3 | 15.7 | 4.7 | 4.6 | 6.2 | 4.5 |
| Hardness (JIS A) | (JIS A) | 42 | 43 | 42 | 44 | 42 | 42 | 42 | 43 |
| Combustion ash content | (wt %) | <0.02 | <0.02 | <0.02 | <0.02 | <0.02 | 0.04 | <0.02 | 0.05 |
| Bleeding resistance |  | ○ | ○ | ○ | ○ | ○ | ○ | ○ | ○ |

|  |  | Comp. Ex. 7 X9 | Comp. Ex. 8 X10 | Comp. Ex. 9 X11 | Ex. 3 X12 | Ex. 4 X13 | Comp. Ex. 10 X14 | Comp. Ex. 11 X15 |
|---|---|---|---|---|---|---|---|---|
| Hydrogenated block copolymer A | Type | A-1 | A-1 | A-1 | A-2 | A-3 | A-4 | A-5 |
|  | Additive amount | 100 | 100 | 100 | 100 | 100 | 100 | 100 |
| Resin polymer powder B | Type | B-7 | B-8 | B-9 | B-1 | B-1 | B-2 | B-2 |
|  | Additive amount | 0.5 | 0.5 | 0.5 | 0.5 | 0.5 | 0.5 | 0.5 |
| Blocking resistance | (%) | 1.8 | 1.2 | 2.2 | 0.3 | 0.1 | 0.1 | 29 |
| Transparency | Haze | 4.4 | 8.5 | 12.5 | 4.6 | 5.3 | 3.8 | 4.1 |
| Hardness (JIS A) | (JIS A) | 43 | 43 | 42 | 61 | 66 | 79 | 73 |
| Combustion ash content | (wt %) | <0.02 | 0.22 | <0.02 | <0.02 | <0.02 | <0.02 | <0.02 |
| Bleeding resistance |  | ○ | Δ | X | ○ | ○ | ○ | ○ |

Examples 5 to 8, Comparative Examples 12 to 22

The hydrogenated block copolymer pellets X of Examples 1 to 4 and Comparative Examples 1 to 11 were each mixed with Random PP Resin, so as to obtain the polyolefin resin compositions of Examples 5 to 8 and Comparative Examples 2 to 22. Using a vented single screw extruder having a cylinder temperature of 200° C., a T die temperature of 200° C. and a screw diameter of 40 mm, the obtained polyolefin resin composition (hydrogenated block copolymer pellet X/Random PP Resin=30/70) was subjected to an extrusion film molding at a discharge amount of 5 kg/hr, at a T die slit thickness of 0.5 mm, at a die slit width of 400 mm, and at a surface temperature of mill roller of 45° C., while the taking-up speed was controlled to have a film thickness of 0.25 mm, so as to obtain a film of the polyolefin resin composition. It is to be noted that the thickness of the film was obtained by cutting the film into a size of 300 mm wide and 200 mm long, measuring thickness at a total of 10 sites (i.e. 5 sites in the wide direction on the upper portion and 5 sites in the wide direction on the lower portion of the film), performing the same measurement as described above on another film to measure thickness at a total of 20 sites, and then obtaining the average of the values. The evaluation results of the polyolefin resin compositions are shown in Table 4.

TABLE 4

|  |  | Ex. 5 C1 | Ex. 6 C2 | Comp. Ex. 12 C3 | Comp. Ex. 13 C4 | Comp. Ex. 14 C5 | Comp. Ex. 15 C6 | Comp. Ex. 16 C7 | Comp. Ex. 17 C8 |
|---|---|---|---|---|---|---|---|---|---|
| Hydrogenated block copolymer pellet X |  | X1 | X2 | X3 | X4 | X5 | X6 | X7 | X8 |
| Hydrogenated block copolymer A |  | A-1 | A-1 | A-1 | A-1 | A-1 | A-1 | A-1 | A-1 |
| Resin polymer powder B |  | B-1 | B-2 | — | B-2 | B-3 | B-4 | B-5 | B-6 |
| Film thickness | (mm) | 0.245 | 0.248 | Not moldable due to blocking | 0.2-0.3 | Not moldable due to blocking | 0.23-0.27 | Not moldable due to blocking | 0.247 |
| Transparency | Haze | 5 | 6.5 |  | 23.5 |  | 13.5 |  | 10.6 |
| Tensile elasticity | (MPa) | 360 | 358 |  | 378 |  | 365 |  | 359 |
| Stress whitening resistance |  | ○ | ○ |  | Δ |  | ○ |  | ○ |
| Surface smoothness | (μm) | 13.5 | 17.5 |  | 12.2 |  | 23.5 |  | 25 |
| Bleeding resistance |  | ○ | ○ |  | ○ |  | ○ |  | ○ |
| Precipitation property under high pH conditions |  | ○ | ○ |  | ○ |  | ○ |  | ○ |
| Combustion ash content | (wt %) | <0.01 | <0.01 |  | <0.01 |  | 0.015 |  | 0.02 |
| Dart impact test |  | ○ | ○ |  | X |  | ○ |  | ○ |

|  |  | Comp. Ex. 18 C9 | Comp. Ex. 19 C10 | Comp. Ex. 20 C11 | Ex. 7 C12 | Ex. 8 C13 | Comp. Ex. 21 C14 | Comp. Ex. 22 C15 |
|---|---|---|---|---|---|---|---|---|
| Hydrogenated block copolymer pellet X |  | X9 | X10 | X11 | X12 | X13 | X14 | X15 |
| Hydrogenated block copolymer A |  | A-1 | A-1 | A-1 | A-2 | A-3 | A-4 | A-5 |
| Resin polymer powder B |  | B-7 | B-8 | B-9 | B-1 | B-1 | B-2 | B-2 |
| Film thickness | (mm) | 0.249 | 0.251 | 0.253 | 0.25 | 0.25 | 0.253 | 0.242 |
| Transparency | Haze | 10.1 | 21.2 | 17.2 | 9 | 8 | 27.8 | 31.5 |
| Tensile elasticity | (MPa) | 357 | 361 | 364 | 590 | 650 | 1100 | 920 |
| Stress whitening resistance |  | ○ | Δ | ○ | ○ | Δ | X | X |
| Surface smoothness | (μm) | 27 | 29.5 | 35 | 19.5 | 21.5 | 43.5 | 48 |
| Bleeding resistance |  | ○ | X | X | ○ | ○ | ○ | ○ |
| Precipitation property under high pH conditions |  | ○ | X | ○ | ○ | ○ | ○ | ○ |
| Combustion ash content | (wt %) | <0.01 | 0.08 | <0.01 | <0.01 | <0.01 | <0.01 | <0.01 |
| Dart impact test |  | ○ | ○ | ○ | ⊙ | ⊙ | X | X |

It is to be noted that molding could not be carried out due to blocking in Comparative Examples 12, 14 and 16. In addition, in Comparative Examples 13 and 15, unstable moldability was found, and a variation in thickness was observed.

The present application is based on a Japanese patent application (Japanese Patent Application No. 2012-143103) filed with the Japan Patent Office on Jun. 26, 2012; the disclosure of which is hereby incorporated by reference.

INDUSTRIAL APPLICABILITY

The molded product of the present invention, which comprises a hydrogenated block copolymer pellet, to which polyethylene powder B is applied, or a polyolefin resin composition, can be used as an injection-molded product, a hollow-molded product, a pressure-molded product, a vacuum-molded product, an extrusion-molded product, etc., having various forms such as a sheet, a film and a tube. In particular, a molded product of the polyolefin resin composition of the present invention is excellent in surface smoothness (roll transcription property during the molding of a sheet) and the balance between the flexibility and stress-whitening resistance of the molded product, has no precipitation, such as bleeding-out, on the surface of the molded product, and has no precipitation even when it is used under high pH conditions. Also, this molded product has low combustion ash content and is excellent in transparency. Thus, the present molded products can be widely used for automobile products, architectural products, various types of wrapping materials, commodities, etc. Among others, the present molded products can be preferably used as various types of wrapping materials such as a sheet and a film, molded products used for food products, molded products for medical use, such as a tube and a transfusion bag, molded products used for nonwoven materials and/or hygiene products such as disposable diapers and/or sanitary products, and molded products used for optical materials.

The invention claimed is:

1. A hydrogenated block copolymer pellet comprising 100 parts by mass of a pellet molded product of hydrogenated block copolymer A and 0.01 to 1.5 parts by mass of a dusting agent of polyethylene powder B, wherein the hydrogenated block copolymer A comprises at least one polymeric block a mainly comprising a vinyl aromatic monomer unit and at least one polymeric block b mainly comprising a conjugated diene monomer unit, in which a total of a 1,2-bond content and a 3,4-bond content in the polymeric block b before hydrogenation is 40% to 90%, the hydrogenated block copolymer A has a hardness (JIS-A) of 30° to 67°, a content of the polymeric block a in the hydrogenated block copolymer A is 5% to 30% by mass, and the polyethylene powder B has a number average molecular weight of 15,000 or less, an average particle diameter of 1 to 15 μm, and an angle of repose of 45° to 70°.

2. The hydrogenated block copolymer pellet according to claim 1, wherein the polyethylene powder B adheres to a surface of the hydrogenated block copolymer A.

3. The hydrogenated block copolymer pellet according to claim 1, wherein the polyethylene powder B has a melting point of 110° C. or higher.

4. The hydrogenated block copolymer pellet according to claim 1, wherein 80% or more of an olefin unsaturated double bond contained in the polymeric block b before hydrogenation is hydrogenated.

5. The hydrogenated block copolymer pellet according to claim 1, wherein
the vinyl aromatic monomer unit comprises a styrene unit, and
the conjugated diene monomer unit comprises a butadiene unit.

6. The hydrogenated block copolymer pellet according to claim 1, wherein the total of the 1,2-bond content and the 3,4-bond content in the polymeric block b before hydrogenation is 40% to 60%.

7. The hydrogenated block copolymer pellet according to claim 1, wherein the total of the 1,2-bond content and the 3,4-bond content in the polymeric block b contained before hydrogenation is more than 60% and 90% or less.

8. The hydrogenated block copolymer pellet according to claim 1, wherein
the hydrogenated block copolymer A comprises a following tetrablock structure: the polymeric block a—the polymeric block b (b1)—the polymeric block a—the polymeric block b (b2), and
a mass of the b2 is 0.5% to 9% by mass based on a total mass of the hydrogenated block copolymer A, and a mass of the b1 is 50% or more greater than the mass of the b2.

9. The hydrogenated block copolymer pellet according to claim 1, wherein
the polyethylene powder B has the average particle diameter of 1 to 10 μm, and
the polyethylene powder B has the angle of repose of 50° to 65°.

10. A molded product comprising the hydrogenated block copolymer pellet according to claim 1.

11. A polyolefin resin composition comprising the hydrogenated block copolymer pellet according to claim 1 and a polyolefin resin C, wherein
the hydrogenated block copolymer pellet/the polyolefin resin C=3 to 97 parts by mass/97 to 3 parts by mass.

12. A molded product comprising the polyolefin resin composition according to claim 11.

* * * * *